United States Patent [19]

Leyrer et al.

[11] Patent Number: 5,371,056
[45] Date of Patent: Dec. 6, 1994

[54] OXIDATIVE DIESEL CONTROL CATALYST

[75] Inventors: Juergen Leyrer, Alzenau; Egbert Lox; Bernd Engler, both of Hanau; Rainer Domesle, Alzenau, all of Germany

[73] Assignee: Degussa Aktiengesellschaft, Frankfurt am Main, Germany

[21] Appl. No.: 49,224

[22] Filed: Apr. 20, 1993

[30] Foreign Application Priority Data

Apr. 21, 1992 [DE] Germany .............................. 4213018

[51] Int. Cl.$^5$ ..................... B01J 21/00; B01J 23/22; B01J 23/40; B01J 29/04
[52] U.S. Cl. ........................ 502/66; 502/74; 502/242; 502/247; 502/326; 502/327; 502/350; 502/353
[58] Field of Search .................. 502/66, 74, 242, 247, 502/326, 327, 350, 353

[56] References Cited

U.S. PATENT DOCUMENTS

| | | | |
|---|---|---|---|
| 3,873,469 | 3/1975 | Foster et al. | 502/242 |
| 4,327,188 | 4/1982 | Endo et al. | 502/242 |
| 4,477,417 | 10/1984 | Domesle et al. | 423/213.2 |
| 4,515,758 | 5/1985 | Domesle et al. | 423/213.2 |
| 4,828,807 | 5/1989 | Domesle et al. | 423/213.7 |
| 5,157,007 | 10/1992 | Domesle et al. | 502/66 |

FOREIGN PATENT DOCUMENTS

| | | |
|---|---|---|
| 0225953 | 6/1987 | European Pat. Off. . |
| 3141713 | 5/1983 | Germany . |
| 3232729 | 3/1984 | Germany . |
| 3407172 | 9/1985 | Germany . |
| 3940758 | 6/1991 | Germany . |

OTHER PUBLICATIONS

Y. Tan et al., "Coated Silica as Support for Platinum Catalyst," *Journal of Catalysis*, vol. 129, pp. 447–456 (1991).

*Primary Examiner*—Carl F. Dees
*Attorney, Agent, or Firm*—Beveridge, DeGrandi, Weilacher & Young

[57] ABSTRACT

An oxidative diesel control catalyst is disclosed which has a high conversion rate for hydrocarbons and carbon monoxide and an inhibited oxidation effect on nitrogen oxides and sulfur dioxides and which contains a monolithic catalyst element with throughflow passages of ceramic or metal coated with an activity-promoting dispersion coating of the fine-particle metal oxides aluminum oxide, titanium oxide, silicon oxide, zeolite or mixtures thereof as support of the catalytically active components, the active components being present in the form of platinum, palladium, rhodium and/or iridium doped with vanadium or in contact with an oxidic vanadium compound. The reduced oxidation effect on sulfur dioxide is obtained by virtue of the fact that the fine-particle metal oxides are surface-modified aluminum oxide, titanium oxide, silicon oxide, zeolite or mixtures thereof. The surface modification is a coating of the specific surface of the metal oxides with a layer of titanium dioxide or silicon dioxide of 1 to 5 monolayers.

16 Claims, 2 Drawing Sheets

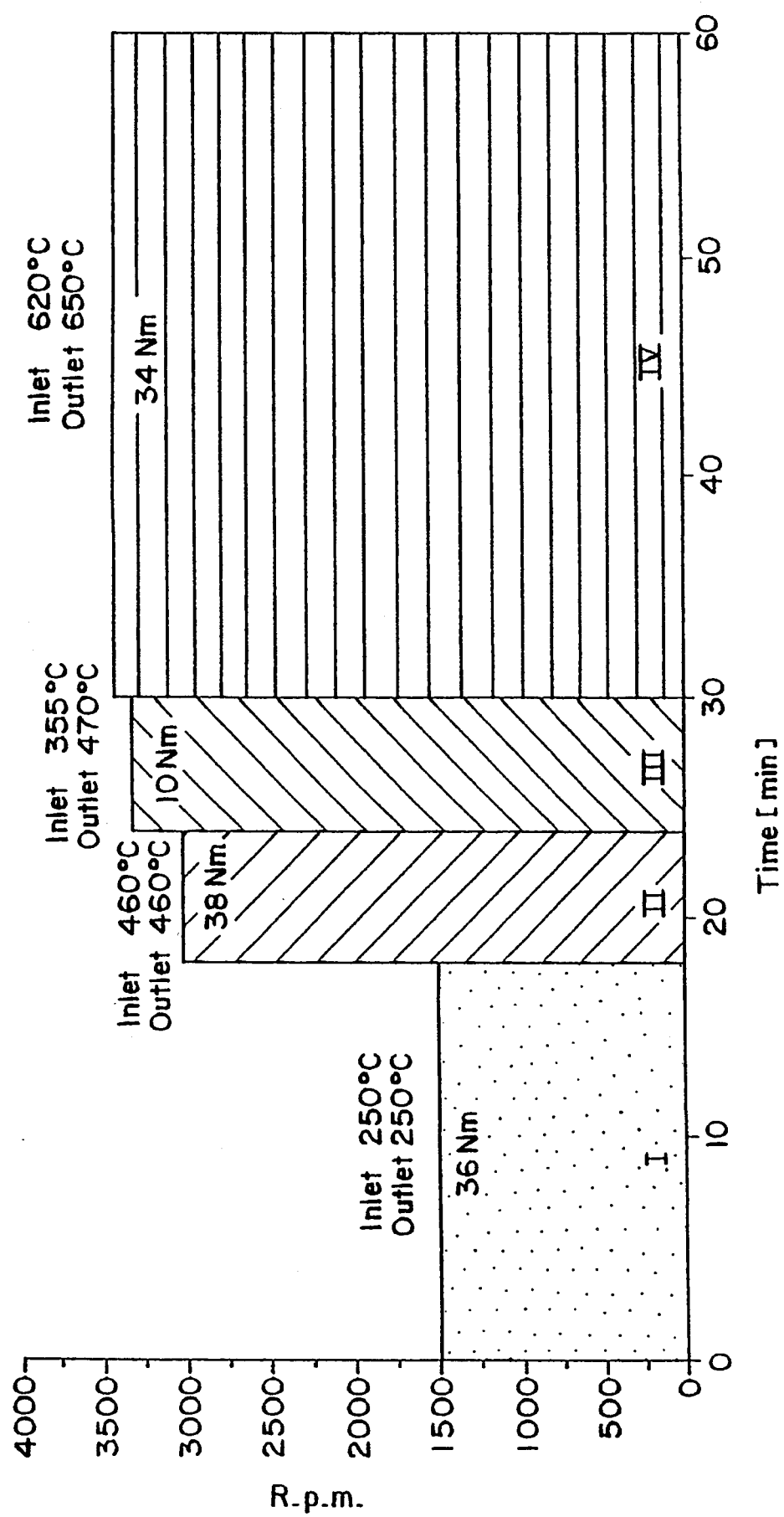

OXIDATIVE DIESEL CONTROL CATALYST

INTRODUCTION AND BACKGROUND

The present invention relates to an oxidative diesel control catalyst which has a high conversion rate for hydrocarbons and carbon monoxide and an inhibited oxidation effect on nitrogen oxides and sulfur dioxide. The catalyst structure contains a monolithic catalyst element with throughflow passages of ceramic or metal coated with an activity-promoting dispersion coating of the fine-particle metal oxides aluminum oxide, titanium oxide, silicon oxide, zeolite or mixtures thereof as support for the catalytically active components. The active components are present in the form of platinum, palladium, rhodium and/or iridium doped with vanadium or in contact with an oxidic vanadium compound.

Diesel exhaust gases contain carbon monoxide, aldehydes, hydrocarbons, polyaromatic hydrocarbons (PAC), sulfur dioxide and nitrogen oxides as pollutants which should be removed by suitable cleaning of the exhaust gases. The sulfur dioxide in the exhaust gas is formed from the sulfur present in a quantity of about 0.3% in the diesel fuel and leads to a sulfur dioxide component in the exhaust gas of 10 to 200 ppm, depending on the particular load and speed of the engine. Although diesel engines produce nitrogen oxides to a far lesser extent than spark-ignition engines, their percentage content in the exhaust gas is still around three times higher than in the exhaust gas of a spark-ignition engine after cleaning with a controlled three-way catalyst.

In addition to these pollutants which are substantially gaseous at the typical exhaust gas temperatures of a diesel engine of 225° to 350° C., diesel engines emit exhaust particles in considerable quantities, depending on the mode of operation. These particles consist of a sooty core and—adsorbed thereon—unburnt hydrocarbons, polyaromatic hydrocarbons (PAC) and also metal compounds, water and sulfates.

The three-way catalysts used in spark-ignition engines cannot be used to control diesel exhaust because diesel exhaust gases have a high oxygen content of 1 to 15 vol-%. This leads to air ratios lambda of the diesel exhaust gases or greater than 1. In contrast, three-way catalysts require stoichiometrically composed exhaust gases with air ratios lambda of 1 for oxidation of the hydrocarbons and carbon monoxide and for simultaneous reduction of the nitrogen oxides.

Filters based on fine-pored ceramic monoliths with reciprocally blocked passages (so-called wall flow filters), foam ceramic, wire mesh packs, ceramic tubes, ceramic fiber wound filters, etc. have already been proposed for reducing the particle emission of diesel exhaust gases containing oxides of sulfur and nitrogen. The diesel exhaust particles can be removed from the exhaust gas stream by means or filtration units such as these. However, the particles filtered off can only be eliminated by burning to regenerate the filters in a few operational states in which the exhaust gas temperature is sufficiently high.

It is known that the regeneration behavior of the filter systems mentioned above can be improved by coating with catalyst substances which reduce the ignition temperature, such as vanadium pentoxide, vanadates, for example $AgVO_3$, and perrhenates. These active substances may be doped with a fine-particle support material and a noble metal introduced by impregnation, such as platinum, may also be present (see DE-OS 32 32 729, DE-OS 31 41 713 and DE-OS 34 07 712).

It has meanwhile been found that the conversion efficiency of the wall flow filters now predominantly used for hydrocarbons and carbon monoxide is unsatisfactory, particularly at the low exhaust gas temperatures of diesel engines, even if the filters are coated with catalytically active components of the type mentioned above. In addition, the use of wall flow filters coated with catalyst and support materials involves the disadvantage of a high exhaust gas back pressure which impairs engine efficiency, particularly where the exhaust gases contain increased particle levels. Efforts to overcome this disadvantage by increasing the catalyst loading have not been successful. Increasing the geometric dimensions to reduce the back pressure is prevented by the limited space available in most vehicles.

The first major improvement in diesel exhaust control was provided by the diesel oxidation catalyst according to DE-OS 39 40 758. The catalyst in question is a catalyst which operates continuously without particle deposition and cyclic particle elimination for oxidative diesel exhaust control, which has a high conversion rate for hydrocarbons and carbon monoxide at low temperatures and an inhibited oxidation effect on NO and $SO_2$ and which contains as active component vanadium compounds and platinum group metals applied to fine-particle aluminum oxide, titanium oxide and silicon oxide, zeolite and mixtures thereof as activity-promoting supports.

Compared with wall flow filters, this known catalyst shows an increased conversion rate for the gaseous pollutants combined with the effective elimination of particles by burning. Assuming cell density to be the same, this positive effect can be explained by the fact that the molecules or agglomerates passing through the long passages of the free-throughflow monolith or honeycomb effectively come into contact with the catalytically coated passage surface far more frequently than in the case of wall flow filters. In the latter case, each exhaust gas constituent first passes only once through the catalytically coated porous wall and then enters the middle of the outflow passage through the flow streams entering a given passage through the four adjacent passages, is concentrated and is prevented from entering into wall contacts of comparable extent.

The extent to which diesel exhaust gases can be cleaned with the described diesel oxidation catalyst represent a significant improvement over the cleaning effect obtainable with filter systems. However, in view of the more stringent legal requirements which diesel exhaust control now has to satisfy, there is a need for further reduction in particle emission and for an improvement in long-term stability for the same high conversion rate for the gaseous pollutants hydrocarbons, carbon monoxide and nitrogen oxides.

Since the agglomeration of the exhaust particles is promoted to a very considerable extent by the presence of sulfates in the exhaust gas, measures must be taken to reduce particle emission and to improve suppression of the oxidation of the sulfur present in the diesel fuel from $SO_2$ to $SO_3$.

SUMMARY OF THE INVENTION

Accordingly, it is an object of the present invention to provide an oxidative diesel control catalyst of the type described with a high conversion rate for hydrocarbons and carbon monoxide and an inhibited oxidation effect on nitrogen oxides and sulfur trioxide, of which the oxidation effect on $SO_2$ would be further reduced by comparison with the prior art and which, at the same time, would show improved long-term behavior.

The above and other objects are attained herein by an oxidative diesel control catalyst which has a high conversion rate for hydrocarbons and carbon monoxide and an inhibited oxidation effect on nitrogen oxides and sulfur dioxides and which contains a monolithic catalyst element with through-flow passages of ceramic or metal coated with an activity-promoting dispersion coating of the fine-particle metal oxides aluminum oxide, titanium oxide, silicon oxide, zeolite or mixtures thereof as support for the catalytically active components. The active components are present in the form of platinum, palladium, rhodium and/or iridium doped with vanadium or in contact with an oxidic vanadium compound.

A feature of the catalyst of the invention resides in the fine-particle metal oxides which are surface-modified aluminum oxide, titanium oxide, silicon oxide, zeolite or mixtures thereof obtainable by stirring the fine-particle metal oxides or mixtures thereof into an alcoholic solution of a titanium oxide and/or silicon oxide, precursor, removing the alcoholic solvent with continuous stirring under reduced pressure and drying the solid remaining behind at elevated temperature and, after grinding for 0.5 to 4 hours, calcining the ground solid at 300° to 600° with decomposition of the titanium and/or silicon oxide precursors to titanium dioxide and silicon dioxide.

The surface properties of the metal oxides are advantageously modified by the measures taken in accordance with the invention. It has been found that the metal oxides thus treated have a positive effect on reducing the oxidation of $SO_2$ to $SO_3$. In contrast to the physical mixture described in DE-OS 39 40 758 of, for example, aluminum oxide with titanium dioxide (Degussa P 25, rutile/anatase mixture, specific surface 51 $m^2/g$), the titanium oxide applied to the remaining metal oxides for surface modification shows considerably improved long-term behavior.

The fine-particle metal oxides surface-modified in accordance with the invention are large-surface metal oxides known in the catalyst field, such as for example aluminum oxide of the transition series which, to improve their temperature stability, may be doped in known manner, for example with rare earth oxides.

For effectively modifying the metal oxides, their specific surface has to be provided with a layer of titanium dioxide and/or silicon dioxide comprising 1 to 5 monolayers. The quantity of $TiO_2$ required for coating a specific surface or 100 $m^2$ with a monolayer is 0.098 g $TiO_2$ as calculated in accordance with Tan et al. ("Coated Silica as Support for Platinum Catalyst" in Journal of Catalysis 129 (1991) 447–456). Organotitanium or organosilicon compounds having the general formula $Ti(OR)_4$ or $Si(OR)_4$, where R is an organic rest, may be used with particular advantage as titanium oxide and/or silicon oxide precursors. Suitable titanium oxide precursors are, for example, tetraethyl orthotitanate ($Ti[OC_2H_5]_4$), tetra-tert. butyl orthotitanate ($Ti[OC(CH_3)_3]_4$), tetraisopropyl orthotitanate ($Ti[OCH(CH_3)_2]_4$) and tetrapropyl orthotitanate ($Ti[OCH_2CH_2CH_3]_4$).

To ensure that their advantageous effects are optimally developed, the modified metal oxides should be applied to the monolith in a concentration of 30 to 250, preferably 75 to 180 and, more preferably, 90 to 150 g/1 catalyst volume in the form of a dispersion coating. The vanadium, expressed as $V_2O_5$, may be present in a concentration of 0.1 to 15 g/1 catalyst volume while the platinum group metals may be present in a concentration of 0.1 to 7 g/1 catalyst volume. Suitable catalyst monoliths are inert supports in honeycomb form with 5 to 100 cells/$cm^2$. Of the platinum group metals, platinum and/or palladium have proved to be particularly effective.

The platinum group metals doped with vanadium or in contact with an oxidic vanadium compound are obtainable in accordance with DE-OS 39 40 758 by simultaneous or successive (in any order) impregnation of the activity-promoting dispersion coating with a solution of compounds of the platinum group metals and a solution of a vanadium compound, drying and optionally calcination at temperatures of at least 200° C., preferably in a hydrogen-containing gas stream. Impregnation with at least one of the two starting materials for the active component may be carried out after or before application of the activity-promoting dispersion coating to the inert support.

The surface-modified metal oxides to be used in accordance with the invention have a completely unexpected and surprising effect on the surface roughness of the final dispersion coating. It has been found that the catalysts according to the invention show greater surface roughness than comparison catalysts from the prior art although metal oxides having the same average particle diameters are used in both cases. The improved conversion efficiency of the catalysts according to the invention may be partly attributed to the greater surface roughness. By virtue of the surface roughness, the exhaust gas is subjected to greater turbulence in the passages of the catalyst monolith and hence comes more intensively into contact with the catalytic coating.

BRIEF DESCRIPTION OF THE DRAWINGS

The invention is illustrated by the following Examples in conjunction with the accompanying drawings, wherein:

FIG. 1 shows the ageing cycle for diesel oxidation catalysts.

DETAILED DESCRIPTION OF THE INVENTION

Figure 2A:
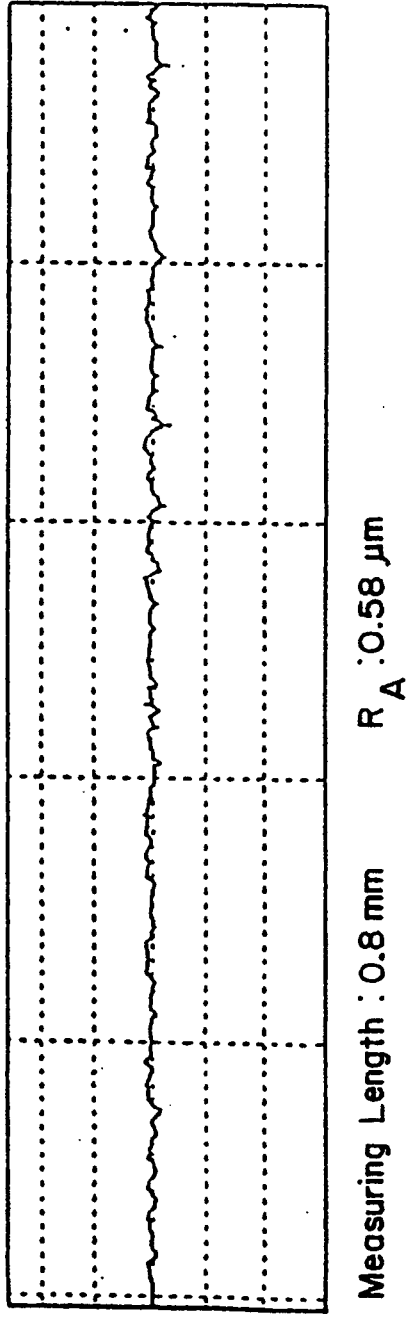
FIG. 2a illustrates roughness measurement on the surface coating of a comparison catalyst CC1.

Honeycomb monoliths of cordierite were used for the production of catalysts according to the invention. They have a cell density of 62 cells/$cm^2$ with wall thicknesses of 0.17 mm.

Comparison Example 1

Comparison catalyst CC1

A comparison catalyst from the prior art was produced as follows:

An aqueous coating dispersion having a solids content of 30% was prepared. The suspension contained 60% by weight γ-aluminum oxide (specific surface 180 $m^2/g$) and 40% by weight titanium dioxide (Degussa P 25; specific surface 50 $m^2/g$; rutile/anatase mixture), based on dry matter. A catalyst monolith was then coated with the metal oxides by immersion in the coating dispersion and, after excess suspension had been removed by blowing, was dried in air at 120° C. After calcination for 2 hours at 400° C., the coated monolith was impregnated with an aqueous solution of $Pt(NH_3)_4(OH)_2$, dried in air at 150° C. and calcined at 300° C. This was followed by impregnation with vanadyl oxalate, drying at 120° C. and vanadyl decomposition in air at 500° C. The catalyst intermediate thus obtained was reduced for 2 hours at 500° C. in a stream of forming gas (95% $N_2$, 5% $H_2$).

The final catalyst contained 64 g titanium oxide, 96 g aluminum oxide, 5 g vanadium pentoxide and 1.77 g platinum per liter catalyst volume.

Comparison Example 2

Comparison catalyst CC2

A second comparison catalyst was produced in the same way as in Comparison Example 1, except that the titanium oxide (Degussa P 25) was replaced by a 100% anatase modification (specific surface 95 $m^2/g$).

Example 1

Catalyst C1 according to the invention containing $TiO_2$-modified $\gamma$-aluminum oxide.

The same $\gamma$-aluminum oxide as in Comparison Example 1 was used for the catalyst according to the invention. To modify its specific surface with titanium oxide, the $\gamma$-aluminum oxide was stirred into an alcoholic solution (ethanol) of tetraethyl orthotitanate ($C_8H_{20}O_4Ti$). After stirring for 2 hours, the ethanol was removed in a rotary evaporator (water jet vacuum, T=50° C.) and the material formed was dried in air for 16 hours at 120° C. After grinding, the $TiO_2/Al_2O_3$ powder formed was calcined in air for 4 hours at 400° C.

The $TiO_2/Al_2O_3$ powder thus produced contained 60% by weight aluminum oxide and 40% by weight titanium oxide, based on its total weight. This quantity of titanium oxide corresponds to a coating of the specific surface of the aluminum oxide used with approximately 3 monolayers of titanium dioxide, as calculated in accordance with Tan et al. "Coated Silica as Support for Platinum Catalyst" in Journal of Catalysis 129, (1991) 447–456).

An aqueous coating dispersion having a solids content of 30% was prepared from the $TiO_2/Al_2O_3$ powder. A catalyst monolith was coated with this coating dispersion and was then further processed in exactly the same way as in Example 1. The final catalyst contained 160 g $TiO_2/Al_2O_3$, 5 g $V_2O_5$ and 1.77 g Pt per liter catalyst volume.

Example 2

Catalyst C2 according to the invention containing $TiO_2$-modified silicon dioxide.

Catalyst C2 according to the invention was produced in exactly the same way as in Example 1, except that the aluminum oxide was replaced by silicon dioxide (specific surface 260 $m^2/g$). The final catalyst contained per liter catalyst volume 160 g $TiO_2/SiO_2$ composed of 40% by weight $TiO_2$ and 60% by weight $SiO_2$, based on the total quantity of $TiO_2/SiO_2$. The quantity of $TiO_2$ selected corresponded to a coating of the specific surface of silicon dioxide with approximately 2 monolayers of titanium dioxide.

Example 3

Catalyst C3 according to the invention containing $SiO_2$-modified $\gamma$-aluminum oxide.

Catalyst C3 according to the invention was produced in exactly the same way as in Example 1, except that the tetraethyl orthotitanate ($C_8H_{20}O_4Ti$) was replaced by tetraethoxysilane ($C_8H_{20}O_4Si$). The final catalyst contained per liter catalyst volume 160 g $SiO_2/Al_2O_3$ composed of 40% $SiO_2$ and 60% by weight $Al_2O_3$, based on the total quantity of $SiO_2/Al_2O_3$. The quantity of $SiO_2$ selected corresponded to a coating of the specific surface of the aluminum oxide with approximately 2 monolayers of silicon dioxide.

Example 4

Catalyst C4 according to the invention containing $SiO_2$-modified titanium oxide.

Catalyst C4 according to the invention was produced in exactly the same way as in Example 3, except that the aluminum oxide was replaced by titanium dioxide (specific surface 95 $m^2/g$). The final catalyst contained per liter catalyst volume 20% by weight $SiO_2$ and 80% by weight $TiO_2$, based on the total quantity of $SiO_2/TiO_2$. The quantity of $SiO_2$ selected corresponded to a coating of the specific surface of the titanium dioxide with approximately 2 monolayers or silicon dioxide.

Example 5

Light-off and activity tests

The diesel oxidation catalysts according to Comparison Examples 1 and 2 and Examples 1 to 4 were tested on a stationary bench dynamometer. It was equipped with a 4 cylinder diesel engine (55 KW; 1.6 liter cubic capacity) and a water eddy current break (Schenck AG type 230). A commercial diesel fuel containing 0.2% sulfur was used as the test fuel.

In light-off tests, the conversion of carbon monoxide, hydrocarbons, nitrogen oxide and sulfur dioxide was measured in dependence upon the exhaust gas temperature before the catalyst at a space velocity of 120,000 $h^{-1}$.

After testing in the fresh state, the catalysts were aged in the engine for 50 hours. The ageing cycle used is illustrated in FIG. 1. One cycle lasted 60 minutes and was repeated 50 times to age the catalysts.

The results of the light-off tests are set out in Table 1 and 2. They show a reduction in the conversion of $SO_2$ at high temperatures for catalysts C1 to C4 in relation to the comparison catalysts for otherwise similar conversion rates for CO, HC and $NO_x$.

Example 6

The catalysts described in Comparison Examples 1 and 2 and Examples 1 to 4 were analyzed by X-ray diffractometry, light microscopy and surface roughness measurement.

The X-ray diffractometric analyses were carried out on preformed $TiO_2/Al_2O_3$, $TiO_2/SiO_2$ and $SiO_2/TiO_2$ oxide powders. The oxide sample of catalyst CC1 in the fresh state snowed the presence of the anatase and rutile modification in a ratio of 78:22. After ageing in air for 7 h at 650° C., the percentage content of the catalytically preferred anatase modification fell to 38%. The oxide sample of comparison catalyst CC2 showed similar behavior. The anatase modification 100% present in the fresh state underwent 65% conversion into rutile through ageing at 650° C. By contrast, the oxide samples according to the invention show the presence of a 100% anatase modification both in the fresh state and after ageing in air for 7 h at 650° C. (Table 3).

Figure 2B:
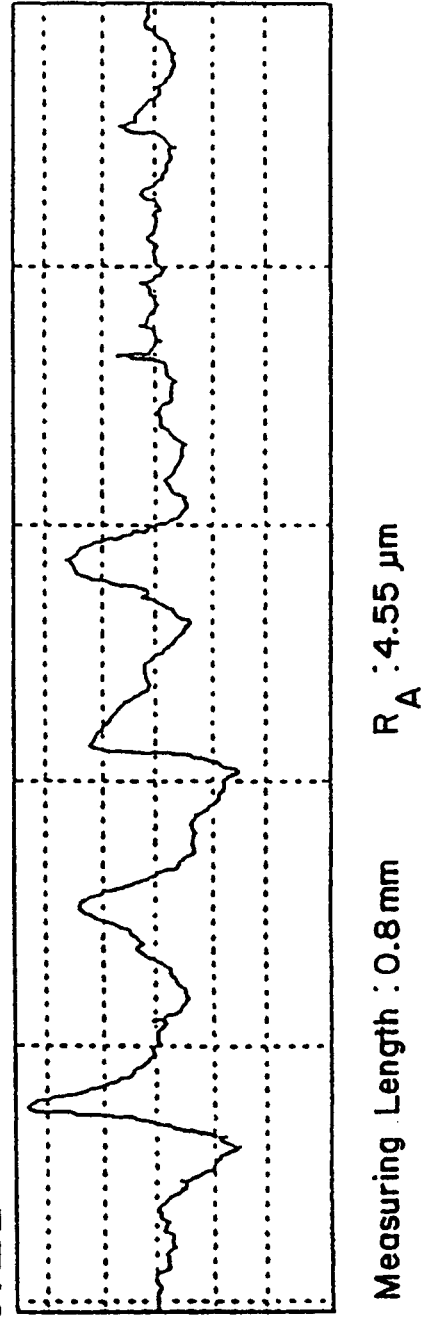
FIG. 2b illustrates roughness measurement on the surface coating of a catalyst C1 according to the invention.

Examination of the coated passage walls of the catalysts using a light microscope showed smooth and compact surface coatings in the case of comparison catalysts CC1 and CC2. By contrast, catalysts C1 to C4 according to the invention had rough and porous surface coatings. This fact was quantitatively confirmed by roughness measurements with a Mahr-Perthen 58P Perthometer (a roughness measuring instrument). FIGS. 2a and 2b show scans of the surface coating over a length of 0.8 mm for comparison catalyst CC1 (FIG. 2a) and catalyst C1 according to the invention (FIG. 2b). The comparison catalyst had a mean square roughness ($R_A$) of only 0.58 μm, i.e. its surface roughness was greater by a factor of 9.

The rough surface coating of catalysts C1 to C4 according to the invention promotes local turbulence in the exhaust gas stream which accelerates mass and heat transport from the gas phase to the surface layer.

Further modifications and variations of the invention to those skilled in the art from the foregoing and are intended to be encompassed by the claims appended hereto.

German application P 42 13 018.2 is relied on and incorporated by reference.

TABLE 1

Results of the light-off tests on a diesel engine (55 kW, 1.6 liter cubic capacity, stationary test conditions) for the catalysts in the fresh state (SV = 120,000 $h^{-1}$)

| Catalyst | T [50%] | | Conversion 350° C. | | | | 450° C. |
|---|---|---|---|---|---|---|---|
| | CO | HC | CO | HC | $SO_2$ | $NO_x$ | $SO_2$ |
| CC1 | 220 | 221 | 91 | 82 | 13 | 2 | 21 |
| CC2 | 221 | 222 | 90 | 80 | 14 | 1 | 25 |
| C1 | 195 | 217 | 95 | 78 | 0 | 3 | 5 |
| C2 | 200 | 217 | 90 | 79 | 4 | 3 | 9 |
| C3 | 205 | 215 | 91 | 79 | 0 | 1 | 2 |
| C4 | 203 | 210 | 89 | 85 | 0 | 3 | 1 |

TABLE 2

Results of the light-off tests on a diesel engine (55 kW, 1.6 liter cubic capacity, stationary test conditions) for the catalysts after ageing (SV = 120,000 $h^{-1}$)

| Catalyst | T [50%] | | Conversion 350° C. | | | | 450° C. |
|---|---|---|---|---|---|---|---|
| | CO | HC | CO | HC | $SO_2$ | $NO_x$ | $SO_2$ |
| CC1 | 236 | 242 | 91 | 77 | 5 | 2 | 11 |
| CC2 | 230 | 241 | 90 | 79 | 8 | 2 | 13 |
| C1 | 220 | 227 | 91 | 75 | 0 | 3 | 2 |
| C2 | 225 | 217 | 90 | 73 | 2 | 3 | 1 |
| C3 | 218 | 218 | 91 | 70 | 0 | 3 | 2 |
| C4 | 221 | 220 | 90 | 71 | 0 | 2 | 1 |

TABLE 3

Results of the X-ray diffractometric analyses of samples of the oxidic coating dispersions ($TiO_2/Al_2O_3$, $TiO_2/SiO_2$ and $SiO_2/TiO_2$) of catalysts CC1, CC2, C1, C2, C3, C4

| Catalyst | Fresh state Anatase:Rutile | 7 h, 650° C., air, furnace Anatase:Rutile |
|---|---|---|
| CC1 | 78:22 | 38:62 |
| CC2 | 100:0 | 35:65 |
| C1 | 100:0 | 100:0 |
| C2 | 100:0 | 100:0 |
| C3 | — | — |
| C4 | 100:0 | 100:0 |

We claim:

1. An oxidative diesel control catalyst which has a high conversion rate for hydrocarbons and carbon monoxide and an inhibited oxidation effect on nitrogen oxides and sulfur dioxide, comprising:
a monolithic catalyst element with throughflow passages of ceramic or metal coated with an activity-promoting dispersion coating of a fine-particle metal oxide selected from the group consisting of aluminum oxide, titanium oxide, silicon oxide, zeolite and mixtures thereof, as a support for a catalytically active component, said catalytically active component being present and selected from the group consisting of platinum, palladium, rhodium, iridium and mixtures thereof doped with vanadium or in contact with an oxidic vanadium compound,
wherein said fine-particle metal oxide is a surface-modified aluminum oxide, titanium oxide, silicon oxide, zeolite or mixtures thereof obtained by stirring the fine-particle metal oxide or mixtures thereof into an alcoholic solution of a titanium oxide and/or a silicon oxide precursor including an alcoholic solvent, removing the alcoholic solvent with continuous stirring under reduced pressure and drying the solid remaining behind at an elevated temperature and, after grinding for 0.5 to 4 hours, calcining the ground solid at 300° to 600° C. with decomposition of the titanium oxide and/or silicon oxide precursors to titanium dioxide and silicon dioxide.

2. A catalyst as claimed in claim 1, further comprising in the production of the fine-particle metal oxide, the quantity of the dissolved titanium oxide and/or silicon oxide precursor is gauged so that, after calcination of the metal oxides, the specific surface of the metal oxides is provided with a layer of titanium dioxide and/or silicon dioxide comprising 1 to 5 monolayers.

3. A catalyst as claimed in claim 1 wherein the titanium oxide and/or silicon oxide precursors are organotitanium or organosilicon compounds having the formula $Ti(OR)_4$ or $Si(OR)_4$, where R is an organic radical.

4. A catalyst as claimed in claim 1 wherein the activity-promoting dispersion coating is present in a concentration of 30 to 250 g/dm³ catalyst volume, the vanadium expressed as $V_2O_5$ is present in a concentration of 0.1 to 15 g/dm³ catalyst volume and the catalytically active component is present in a concentration of 0.1 to 7 g/dm³ catalyst volume.

5. A catalyst as claimed in claim 1 wherein the activity-promoting dispersion coating is present in a concentration of 75 to 180 g/dm³ catalyst volume, the vanadium expressed as $V_2O_5$ is present in a concentration of 0.1 to 15 g/dm³ catalyst volume and the catalytically active component is present in a concentration of 0.1 to 7 g/dm³ catalyst volume.

6. A catalyst as claimed in claim 1 wherein the activity-promoting dispersion coating is present in a concentration of 90 to 150 g/dm³ catalyst volume, the vanadium expressed as $V_2O_5$ is present in a concentration of 0.1 to 15 g/dm³ catalyst volume and the catalytically active component is present in a concentration of 0.1 to 7 g/dm³ catalyst volume.

7. A catalyst as claimed in claim 1 wherein a ceramic monolithic support is used as the monolithic catalyst element.

8. A catalyst as claimed in claim 7 wherein the monolithic support is a honeycomb.

9. A catalyst as claimed in claim 1 wherein the monolith catalyst element has a cell density of 5 to 100 cells/cm$^2$.

10. A catalyst as claimed in claim 1 wherein platinum and/or palladium is present as the catalytically active component.

11. A process of making an oxidation diesel control catalyst which has a high conversion rate for hydrocarbons and carbon monoxide and an inhibited oxidation effect on nitrogen oxides and sulfur dioxide, said catalyst being a monolithic catalyst element with through-flow passages of ceramic or metal coated with an activity-promoting dispersion coating of a fine-particle metal oxide selected from the group consisting of aluminum oxide, titanium oxide, silicon oxide, zeolite and mixtures thereof, as a support for a catalytically active component, said catalytically active component being present and selected from the consisting of platinum, palladium, rhodium, iridium and mixtures thereof doped with vanadium or in contact with an oxidic vanadium compound, wherein said fine-particle metal oxide is a surface-modified aluminum oxide, titanium oxide, silicon oxide, zeolite or mixtures, said process comprising: stirring the fine-particle metal oxide or mixtures thereof into an alcoholic solution of a titanium oxide and/or silicon oxide precursor including an alcoholic solvent, removing the alcoholic solvent with continuous stirring under reduced pressure and drying the solid remaining behind at an elevated temperature, and, after grinding for 0.5 to 4 hours, calcining the ground solid at 300° to 600° C. with decomposition of the titanium and/or silicon oxide precursors to titanium dioxide and silicon dioxide to provide a surface-modified, fine-particle metal oxides;

dispersing the surface-modified, fine-particle metal oxide in water to form an aqueous coating dispersion;

coating the monolithic catalyst element with aqueous coating dispersion, drying and calcining the coated monolithic catalyst element, and impregnating the coated monolithic catalyst element with the catalytically active component and the oxidic vanadium compound.

12. A catalyst as claimed in claim 1, wherein the precursor is a titanium oxide precursor selected from the group consisting of tetraethyl orthotitanate, tetra-tert butyl orthotitanate, tetraisopropyl orthotitanate and tetrapropyl orthotitanate.

13. A process as claimed in claim 11, wherein the titanium oxide and/or silicon oxide precursors are organotitanium or organosilicon compounds having the formula Ti(OR)$_4$ or Si(OR)$_4$, where R is an organic rest.

14. A process as claimed in claim 11, wherein the precursor is a titanium oxide precursor selected from the group consisting of tetraethyl orthotitanate, tetra-tert butyl orthotitanate, tetraisopropyl orthotitanate and tetrapropyl orthotitanate.

15. A process as claimed in claim 11, wherein the alcoholic solvent is removed by evaporation.

16. A process as claimed in claim 11, wherein when the fine-particle metal oxide is added to the alcoholic solution of the titanium oxide and/or silicon oxide precursor, an amount of titanium oxide and/or silicon oxide precursor is present such that, after calcination of the surface-modified, fine-particle metal oxides, the surface of the metal oxides is provided with a layer of titanium dioxide and/or silicon dioxide comprising 1 to 5 monolayers.

* * * * *